C. W. LEVALLEY.
TRANSMISSION GEARING.
APPLICATION FILED APR. 6, 1915.
1,194,299.
Patented Aug. 8, 1916.
2 SHEETS—SHEET 1.
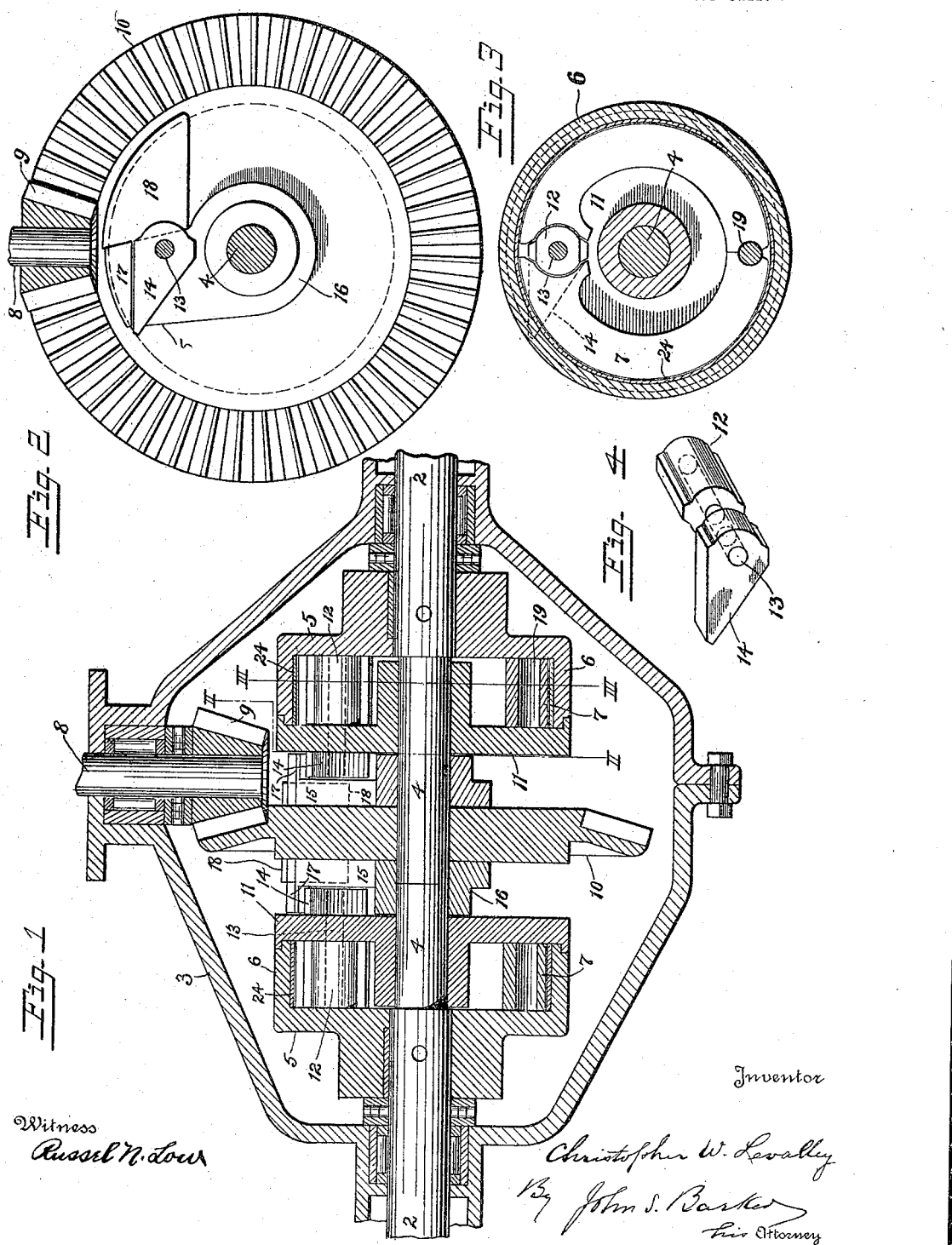

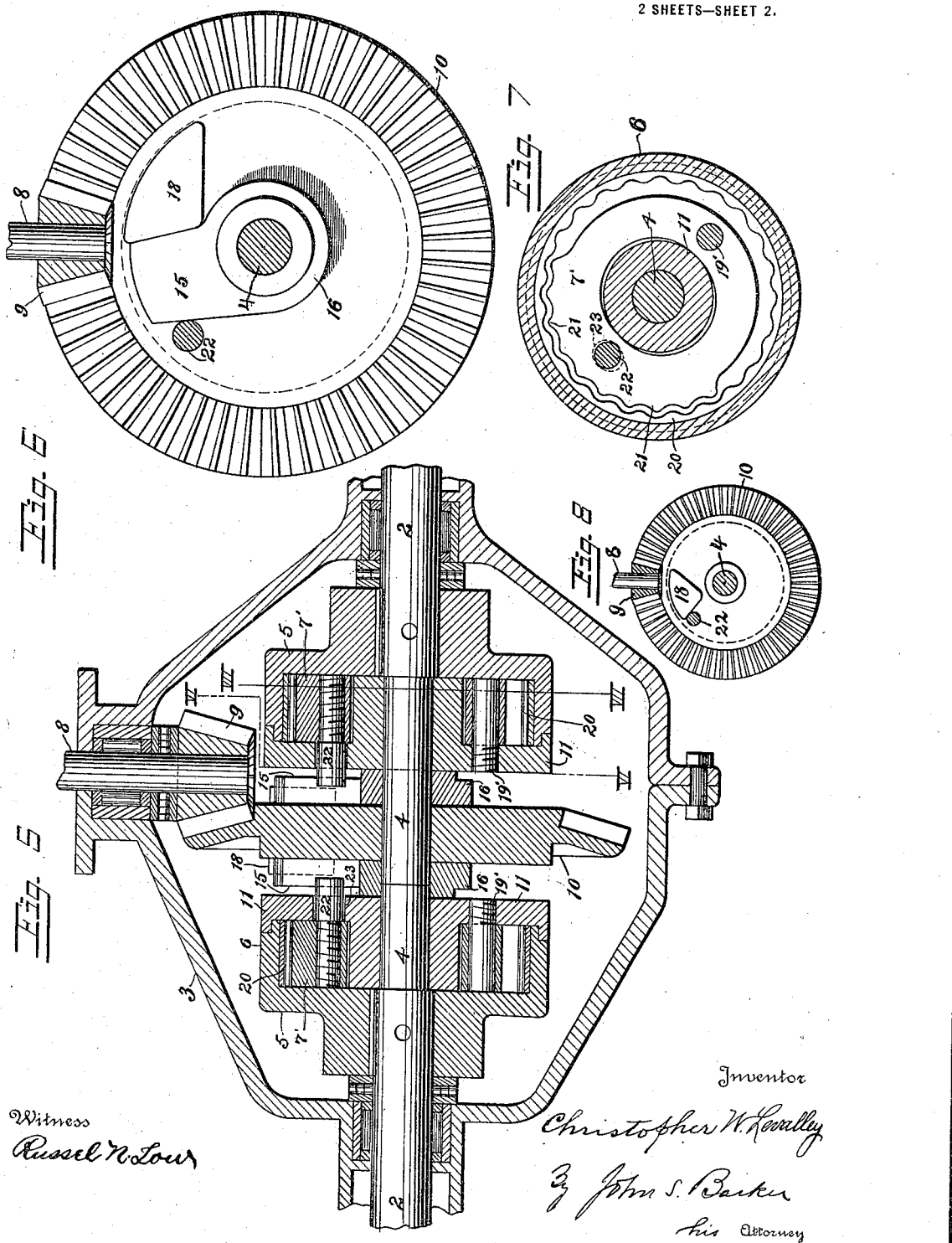

UNITED STATES PATENT OFFICE.

CHRISTOPHER W. LEVALLEY, OF MILWAUKEE, WISCONSIN.

TRANSMISSION-GEARING.

1,194,299.  Specification of Letters Patent.  Patented Aug. 8, 1916.

Application filed April 6, 1915. Serial No. 19,495.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Transmission-Gearing, of which the following is a specification.

My invention relates to that class of transmission gearing which is intended to be interposed between a driving member and a divided driven shaft or member, where provision is made for simultaneously driving both sections of the driven shaft when the two revolve in unison, but, when one turns faster than the other, then driving only the more slowly turning section, the other one running free. Mechanisms of this kind, broadly considered, are well known in the art, and have been applied to motor vehicles.

My present invention has for its object to improve gearing of this kind.

In the accompanying drawings: Figure 1 is a horizontal sectional view of a transmission gearing embodying my invention and adapted to be used as a part of the driving mechanism of a motor vehicle. Fig. 2 is a transverse sectional view taken on the line II—II of Fig. 1. Fig. 3 is a transverse sectional view taken on the line III—III of Fig. 1. Fig. 4 is a perspective view of the device employed for expanding the movable clutch member. Fig. 5 is a horizontal sectional view of a transmission gear provided with a different embodiment of my invention from that illustrated in the views already described. Fig. 6 is a transverse sectional view taken on the line VI—VI of Fig. 5. Fig. 7 is a transverse sectional view taken on the line VII—VII of Fig. 5. Fig. 8 is a cross sectional view similar to Fig. 6 but on a much smaller scale, illustrating another form of the invention.

Referring particularly to Figs. 1 to 4 of the drawings, 2, 2 indicate the sections of a divided driven shaft, such as the rear axle of a motor vehicle. The inner ends of these shaft sections are represented as entering a suitable casing 3 that serves to close in and protect the gearing. The ends of the shaft sections are brought together and are preferably reduced in diameter, as indicated at 4. To each section of the driven shaft there is secured fast a clutch member 5 that is preferably in the form of a shell having an overhanging flange that incloses a chamber in which is mounted the movable clutch member 7.

8 indicates the motor driven shaft suitably supported in the casing and carrying at its inner end a bevel pinion 9 that meshes with a bevel gear 10 loosely supported upon the driven shaft and constituting the main drive gear or member of the transmission mechanism being described.

11, 11 indicate plates loosely supported on the driving shaft and arranged close against the inner edges of the flanges 6 of the shaft-connected clutch members 5, there being preferably a rabbet joint between each of these two parts, and the plates serving to close the chambers in which are located the movable clutch members 7. They also constitute supports for the means employed to operate the movable clutch members. In the form of my invention being described the inner face of the flange 6 of the shaft-connected clutch member is smooth, and the movable clutch member 7 that engages therewith is a divided expansible friction shoe of annular form that lies within the chamber closed by the face plate 11, and close to, but not in frictional engagement with, the inner face of the flange 6. The latter is preferably provided with a lining material 24 adapted to resist wear and also to give good frictional contact with the expansible friction clutch member 7. In order to operate the latter I preferably employ a wing-shaped or expanded head 12 located between the free ends of the friction ring constituting the clutch member 7. This head is supported at the inner end of a short shaft 13 that is mounted in the plate 11. At the outer end of this shaft there is supported an arm 14 lying in the space between the plate 11 and the main driving gear 10.

In order to operate the clutch and bring the main gear 10 into driving connection with a section of the driven shaft it is necessary that means be provided for operating the friction shoe expanding devices that have just been described from the drive gear 10, and I prefer to employ those means which I will now describe.

16 represents a hub loosely supported upon the driven shaft between the drive gear 10 and a face plate 11. An arm 15 extends out from this hub and is provided with a laterally extending projection or contact piece 17 adapted to engage with the arm 14 and operate the means for expanding the friction shoe of the clutch.

18 represents a projection extending out from the face of the drive gear 10 and in position to engage with the arm 15, which is therefore caused to turn with the drive gear when it is revolved. The arm 15 is located in the space between the plate 11 and the drive gear 10.

It will be understood that the parts thus far described are duplicated upon each side of the main gear 10, so that there are connections between it and both sections of the driven shaft.

The operation of the transmission gear which I have described may now be set forth. Under ordinary conditions, that is, when the vehicle is running in a straight course, the main gear will drive the two sections of the shaft uniformly, causing them and the wheels they carry to turn in unison. If, however, the vehicle's course be changed and it take a curve, the shaft carrying the outer wheel will revolve the more rapidly as is well understood, with the result that the clutch member 5 which is secured to such shaft section will run ahead of the main gear 10. Thereupon frictional engagement of the clutch members 5 and 7 will be discontinued, since the drive gear is not now moving rapidly enough, relative to the driven shaft section and the parts it carries, to cause the movable clutch member to be brought into working engagement with the clutch member 5. As the shaft-connected clutch member 5 runs ahead of the drive gear it may carry with it the face plate, the friction shoe or movable member of the clutch, and the parts that operate the latter, with the result that the arm 14 leaves the projection 17 of the driving arm 15, while the latter remains in engagement with the projection 18 of the drive gear 10. This forward movement or overrunning of the fast-turning shaft and the parts which rotate therewith may continue until they gain upon the main gear nearly a complete revolution, and until the arm 14 comes into engagement with that face of the projection 17 of the arm 15 that is opposite its usual driving face, whereupon the said arm will be picked up and carried forward with the shell 5 and associated parts, the arm 15 moving away from the projection 18; and this may continue, if the shaft 2 continues to overrun sufficiently far, until the arm 15 has made nearly a complete revolution and comes into engagement with the rear face of the projection 18. The overrunning parts will then be positively stopped and the arm 14 will be rocked, tilting the head 12 and expanding the friction shoe 7 into clutching engagement with the shaft-connected clutch member 5. This will result in uniting the two sections, 2, 2, of the driven shaft so that they temporarily act as a unitary body. It will, however, very rarely happen that either section of the driven shaft will overrun the drive gear to the extent just described and sufficiently far to carry the parts around to a position in which the driving and driven parts will be locked together by the engagement of the arm 15 with the rear face of the projection 18. As soon as the fast running section of the driven shaft just referred to ceases to overrun, the drive gear will begin to move forward relative to the shaft section referred to and will soon pick up its connection therewith and again begin its normal driving function.

The arm 15, and the clutch operating means designated by the reference numerals 12, 13 and 14, are elements in the train of power transmitting mechanism between the main gear 10 and the driven shaft 2. The friction shoe 7 may be a unitary split expansible ring between the free ends of which is located the head 12 or it may be formed of two segmental, substantially semi-circular, parts as represented in Fig. 3. When thus constructed the ends of the segments of the clutch shoes that are diametrically opposite the ends engaged by the expanding head 12 preferably bear upon a pin or roller bearing 19 located between these parts. This pin may be loosely supported, or it may be mounted in the face plate 11, as may be preferred, both constructions being practical.

In Figs. 5 to 7 I have shown a form of my invention in which a positive clutch is employed instead of a frictional one. The arrangement of parts here is very similar to that already described, and a lengthy description thereof is therefore unnecessary. The same reference numerals are employed in these views as are used in the views illustrating the other construction, where the parts in the two constructions are the same. In this form of the invention the working inner face of the rim or flange of the fixed shaft-connected clutch member 5 is corrugated, preferably a hardened steel corrugated ring, as indicated at 20. The movable element of the clutch consists of an annular clutch shoe 7′ located within the chamber inclosed by the clutch member 5. It is preferably supported upon a pin 19′ mounted in the face plate 11, so as to rock thereon, and is formed with corrugated or toothed sections 21, 21, that are located diametrically opposite the fulcrum pin 19′, and on either side of a pin 22, that is seated in the clutch shoe and extends out therefrom through a slot or elongated opening 23 in the face plate 11. The pin 22 is in position to be engaged by the arm 15, which need not in this form of the invention be formed with an extension 17. It will be understood, without further explanation, that, under ordinary conditions, and when the arm 15 comes into engagement with the pin 22, the movable clutch member 7' is rocked upon its fulcrum 19' until one of its corrugated sections 21 comes into working engagement with the inner face 20 of the rim of the shaft-connected clutch member 5, whereupon driving connection is established. If one of the wheels begins to run faster than the other, and than does the driving gear 10, the clutch elements separate, since they are not now positively forced into and held in working engagement, and this separation may continue until the overrunning shaft section has made a gain of nearly two revolutions on the driving gear 11, after which, on further overrunning, the driving and driven parts will be positively connected through the engagement of the pin 22 with the rear side of the driving arm 15, and the engagement of the latter with the rear side of the driving projection 18, as has been fully described in setting forth the operation of the other form of my invention.

It will be apparent that both forms of the invention described are adapted for driving the shaft in a reverse direction as well as forwardly, as the arm 14 of the first described construction, or the pin 22 of the second described construction, is in position to be acted upon by the driving arm 15 whichever way it be revolved.

The loosely supported arm 15 might be dispensed with, and the projection 18 carried by the main drive gear arranged to operate directly upon a projecting portion of the parts that operate the movable clutch member, and such an arrangement is illustrated in Fig. 8 of the drawings. This arrangement is not so desirable as that which I have described, although it is more simple. It does not allow the fast running wheel to travel freely to the same extent before being arrested by the projection of the clutch shifting devices engaging with the rear face of the drive-gear-carried projection 18 as does the other construction; but otherwise it is a desirable and practical arrangement.

It will be seen that in those embodiments of my invention illustrated in Figs. 1 to 7, inclusive, there is interposed between the driving and each driven element a set of revolving power transmitting connections, supported so as to be freely rotatable to a limited extent relative to each of the said elements and arranged to be driven, through the projection or contact piece 18 carried by the driving element, and, in turn, to drive the member of the transmission gear that is connected fast with the driven element, to wit, in the embodiments of the invention herein illustrated, the clutch member 5. With this arrangement when one of the driven shafts and its clutch member 5 begins to overrun, it turns not only relative to the drive gear but also to the said intermediate loosely supported connections, until, if the said overrunning be long enough continued, the said intermediate loosely mounted connections are by it picked up and carried forward relative to the drive gear, until finally such overrunning is arrested by a reëngagement, although in different relationship from the former engagement, of the said intermediate connecting parts with the main driving element.

What I claim is:—

1. In a transmission gearing, the combination of a driven shaft, a fixed clutch member carried thereby, a main drive gear, a movable clutch member for engaging with the fixed clutch member, means for operating the movable clutch member, an arm loosely supported so as to be free to turn in a path that is concentric with the axis about which the main gear revolves, and arranged to operate the said clutch operating means, and a projection carried by the drive gear for acting on the arm and causing it to turn therewith.

2. In a transmission gearing, the combination of a divided driven shaft, a fixed clutch member carried by each section thereof, a main drive gear, movable clutch members for engaging with the fixed clutch members, means for operating the movable clutch members, arms loosely supported so as to be movable in paths concentric with the axis about which the main gear turns, and projections carried by the drive gear for acting upon the said arms and causing them to turn therewith and act upon the movable clutch operating means.

3. In a transmission gearing, the combination of a driven shaft, a fixed clutch member carried thereby, a main drive gear free to turn about the axis of the said shaft, a movable clutch member for engaging with the fixed clutch member, means for operating the movable clutch member to cause it to engage with the fixed clutch member, an arm loosely supported adjacent to the main drive gear and to the said clutch members and free to turn about the axis of the driven shaft, the arm being arranged to act upon the said means for operating the movable clutch member whether turning in one direction or the other, and a projection carried by the drive gear for acting on the arm and causing it to turn therewith.

4. In a transmission gearing, the combination of a divided driven shaft, fixed clutch members carried by the sections thereof, a main drive gear supported between the said clutch members and free to turn upon an axis concentric with the axis of the driven shaft, movable clutch members for engaging with the fixed clutch members, means for operating the movable clutch members to cause them to engage with the fixed clutch members, supports for the said clutch operating means loosely supported and free to turn about the axis of the driven shaft, and arms loosely supported and free to turn about the axis of the main shaft and arranged to act upon the said clutch-operating means, and projections carried by the drive gear for acting upon the said arms and causing them to turn therewith, the said arms being free to be moved out of engagement with the said projections.

5. In a transmission gearing, the combination of a divided driven shaft, fixed clutch members secured to the sections thereof, a main drive gear supported by the driven shaft between the said fixed clutch members, movable clutch members for engaging with the fixed clutch members, means for operating the movable clutch members, supports for the said clutch-operating means loosely supported by the driven shaft and located respectively adjacent to the fixed clutch members, arms loosely supported by the driven shaft and located between the said supports and the main drive gear and arranged when revolved to act upon the said clutch operating means, and projections carried by the main drive gear for acting on the said arms.

6. In a transmission gearing, the combination of a divided driven shaft, a clutch member carried by each section thereof having a flange inclosing a chamber, a main drive gear supported by the driven shaft located between the said fixed clutch members, movable clutch members located in the chambers inclosed by the flanges of the fixed clutch members and arranged to be forced into engagement therewith, plates loosely supported by the driven shaft and arranged to close the said chambers in the fixed clutch members, means for operating the movable clutch members extending through the said closing plates, arms located between the said closing plates and the main drive gear and loosely supported by the driven shaft so as to be free to turn about the same and act on the means for operating the movable clutch members, and projections carried by the main drive gear and arranged to act upon the arms that operate the movable clutch members.

7. In a transmission gearing, the combination of a divided driven shaft, a fixed clutch member carried thereby having a flange inclosing a chamber, a main drive gear supported by the shaft and located adjacent to the said fixed clutch member, an expansible clutch shoe located in the chamber inclosed by the flange of the fixed clutch member and arranged to be forced into engagement therewith, a plate loosely supported by the driving shaft and arranged to close the chamber in the fixed clutch member, means for operating the said expansible shoe extending through the said closing plate and consisting of an expanding head for acting upon the clutch shoe, and an arm located in the space between the said closing plate and the main gear, and an arm also located in the said space and loosely supported by the driving shaft so as to be free to turn about the same and arranged to act upon the arm of the clutch shoe expanding means, and a projection carried by the drive gear and arranged to act upon the said loosely supported arm.

8. In a transmission gearing, the combination of a divided driven shaft, fixed clutch members carried by the sections thereof, a main drive gear supported between the said clutch members and having driving projections extending out from the opposite faces thereof, movable clutch members for engaging with the fixed clutch members, and means for operating the movable clutch members to cause them to engage with the fixed clutch members, the said means extending into the paths followed by the said driving projections carried by the main drive gear and arranged to be operated by the said projections and being loosely supported so as to be free to revolve about the axis of rotation of the divided shaft, and arranged to rotate relative to the drive gear and with the driven shaft when the latter is turning at a speed greater than that at which the drive gear tends to rotate it.

9. In a transmission gearing, the combination of a drive gear, a pair of driven members and connections between the drive gear and the driven members, including a projection carried by the drive gear, means fixedly connected with one of the driven members through which it is driven, and floating connections supported so as to be free to revolve about the axis of rotation of the driven member, disposed intermediate between the drive gear and driven member, and arranged to be driven by the projection carried by the former and to drive the latter, and free to rotate with the driven member and relative to the drive gear when the former rotates at a speed greater than that at which the drive gear tends to drive it.

10. In a transmission gearing, the combination of a drive gear, a pair of driven members and connections between the drive gear and the driven members, including a projection carried by the drive gear, means fixedly connected with one of the driven members, and floating connections supported so as to be free to revolve to a limited extent about the axis of rotation of the driven member, and independently of both the drive gear and the driven member, such floating connections being disposed intermediate between the drive gear and the driven member and being arranged to be driven by the projection carried by the former and to drive the latter through the means fixedly connected therewith, the said fixedly connected means being arranged to disengage from the said intermediate floating connections when the said driven member rotates at a speed greater than that at which the drive gear tends to drive it, and being arranged to pick up and cause the said floating intermediate connections to rotate with it after it has moved to a limited extent at the said greater speed of rotation.

CHRISTOPHER W. LEVALLEY.

Witnesses:
R. M. PARKER,
JOHN S. BARKER.

Copies of this patent may be obtained for five cents each, by addressing the "Commissioner of Patents, Washington, D. C."